United States Patent
Steele et al.

(10) Patent No.: US 11,092,203 B2
(45) Date of Patent: Aug. 17, 2021

(54) HYBRID TORQUE BAR

(71) Applicant: GOODRICH CORPORATION, Charlotte, NC (US)

(72) Inventors: Leslie Steele, Dayton, OH (US); Thomas P. Filburn, Granby, CT (US); Michael A. Klecka, Coventry, CT (US)

(73) Assignee: Goodrich Corporation, Charlotte, NC (US)

( * ) Notice: Subject to any disclaimer, the term of this patent is extended or adjusted under 35 U.S.C. 154(b) by 558 days.

(21) Appl. No.: 15/962,680

(22) Filed: Apr. 25, 2018

(65) Prior Publication Data

US 2019/0331178 A1  Oct. 31, 2019

(51) Int. Cl.
| | | |
|---|---|---|
| *B33Y 10/00* | (2015.01) | |
| *B33Y 80/00* | (2015.01) | |
| *B64C 25/42* | (2006.01) | |
| *F16D 65/00* | (2006.01) | |
| *F16D 65/02* | (2006.01) | |
| *F16F 7/08* | (2006.01) | |

(52) U.S. Cl.
CPC .............. *F16D 65/02* (2013.01); *B33Y 80/00* (2014.12); *F16D 65/0006* (2013.01); *F16F 7/08* (2013.01); *B33Y 10/00* (2014.12); *B64C 25/42* (2013.01); *F16D 2065/138* (2013.01); *F16D 2065/1392* (2013.01); *Y10T 29/49982* (2015.01)

(58) Field of Classification Search
CPC .................................... F16F 7/08; B64C 25/42
See application file for complete search history.

(56) References Cited

U.S. PATENT DOCUMENTS

| | | | |
|---|---|---|---|
| 4,084,857 A | 4/1978 | Vanderveen | |
| 6,003,954 A | 12/1999 | Everhard et al. | |
| 8,157,062 B2 * | 4/2012 | Enright | F16D 55/36 |
| | | | 188/71.5 |
| 9,266,170 B2 * | 2/2016 | Godfrey | B23P 15/04 |
| 9,850,968 B2 | 12/2017 | Swank et al. | |
| 9,938,003 B2 * | 4/2018 | Rook | F16D 65/827 |
| 10,077,818 B2 * | 9/2018 | Whittle | F16D 55/36 |
| 10,677,300 B2 * | 6/2020 | Steele | F16D 65/02 |
| 2010/0025172 A1 * | 2/2010 | Campbell | F16D 65/12 |
| | | | 188/264 AA |

(Continued)

FOREIGN PATENT DOCUMENTS

| | | |
|---|---|---|
| EP | 0811511 | 12/1997 |
| EP | 0977910 | 2/2000 |

(Continued)

OTHER PUBLICATIONS

European Patent Office, European Search Report dated Oct. 29, 2019 in Application No. 19170184.6.

*Primary Examiner* — Jacob J Cigna
(74) *Attorney, Agent, or Firm* — Snell & Wilmer L.L.P.

(57) ABSTRACT

A hybrid torque bar for a brake assembly may comprise a base portion, a pin extending from a first end of the base portion, and a rail extending between the first end of the base portion and a second end of the base portion opposite the first end. The base portion may be formed using a first manufacturing process. At least one of the pin or the rail may formed using a second manufacturing process. The second manufacturing process may comprise an additive manufacturing technique.

6 Claims, 7 Drawing Sheets

(56) References Cited

U.S. PATENT DOCUMENTS

| | | | | |
|---|---|---|---|---|
| 2015/0308526 A1* | 10/2015 | Swank | ................ | B22F 3/1055 |
| | | | | 403/404 |
| 2016/0221122 A1* | 8/2016 | D'Orlando | ................ | B22F 5/04 |
| 2016/0279710 A1* | 9/2016 | Whittle | ................ | B22F 3/1055 |
| 2016/0279882 A1* | 9/2016 | Davis | ................ | B29C 64/393 |
| 2017/0022614 A1* | 1/2017 | Herrmann | .............. | B33Y 10/00 |
| 2017/0174328 A1 | 6/2017 | Rook | | |
| 2017/0174330 A1 | 6/2017 | Rook | | |
| 2020/0238380 A1* | 7/2020 | Worthing, Jr. | .......... | B22F 7/062 |

FOREIGN PATENT DOCUMENTS

| | | |
|---|---|---|
| EP | 2940340 | 11/2015 |
| EP | 3184422 | 6/2017 |
| EP | 3184843 | 6/2017 |
| EP | 3258129 | 12/2017 |
| WO | 2007/118254 | 10/2007 |
| WO | 2008097386 | 8/2008 |
| WO | 2009082397 | 7/2009 |

* cited by examiner

HYBRID TORQUE BAR

FIELD

The present disclosure relates to brake systems, and more specifically, to torque bars for aircraft brake systems.

BACKGROUND

Torque bars are typically used in aircraft wheel and brake assemblies to couple the wheels to the rotors of the brake assembly. Torque bars typically extend from an inner surface of the wheel in a direction parallel to the rotational axis of the wheel, and are subject to deflection and vibration. The geometries of torque bars have conventionally been limited by conventional, subtractive manufacturing techniques. These geometric limitations can limit the characteristics of the torque bars, such as, for example, the ability to resist deflection and wear. Additionally, machining the torque bar from a single piece of metal tends to generate a large amount of waste material.

SUMMARY

In accordance with various embodiments, the present disclosure provides a hybrid torque bar for a brake assembly. The hybrid torque bar may comprise a base portion, a pin extending from a first end of the base portion, and a first rail extending between the first end of the base portion and a second end of the base portion opposite the first end. An interior portion of at least one of the pin or the first rail may comprise a first metal alloy. An exterior portion of the at least one of the pin or the first rail may comprise a second metal alloy. An intermediate portion of the at least one of the pin or the first rail may extend between the interior portion and the exterior portion.

In various embodiments, the intermediate portion may form a gradient transition between the first metal alloy and the second metal alloy. The gradient transition may include a percent by weight of a wear resistant coating material defined by a smooth function of position along the gradient transition. The wear resistant coating material may comprise at least one of a metal carbide, a nickel-alloy, or a nickel-based super alloy.

In various embodiments, a second rail may extend between the first end of the base portion and the second end of the base portion. A cross member may extend between the first rail and the second rail. The cross member may define an opening.

In various embodiments, a first portion of the first rail extends in a first direction, and a second portion of the first rail extends in a second direction opposite the first direction. An attachment flange may extend from the base portion in the first direction. In various embodiments, the first rail may define a hollow portion.

Also disclosed herein, in accordance with various embodiments, is a wheel assembly. The wheel assembly may comprise a wheel and a hybrid torque bar coupled to the wheel. The hybrid torque bar may comprise a base portion, a pin extending from a first end of the base portion, and a rail extending between the first end of the base portion and a second end of the base portion opposite the first end. An interior portion of at least one of the pin or the rail may comprise a first metal alloy. An exterior portion of the at least one of the pin or the rail may comprise a second metal alloy. An intermediate portion of the at least one of the pin or the rail may extend between the interior portion and the exterior portion.

In various embodiments, the wheel may comprise an inboard wheel half and an outboard wheel half. The pin may be located in a receptacle defined by the inboard wheel half.

In various embodiments, the first metal alloy may comprise a first percentage by weight of a wear resistant coating material, the second metal alloy may comprise a second percentage by weight of the wear resistant coating material, and the intermediate portion may comprise an increasing percentage by weight of the wear resistant coating material. In various embodiments, the wear resistant coating material may comprise a metal carbide, a nickel alloy, or a nickel-based super alloy.

Also disclosed herein, in accordance with various embodiments, is a method of making a hybrid torque bar for a wheel assembly. The method may comprise forming a base portion using a first manufacturing process, forming a pin extending from a first end of the base portion, forming an attachment flange extending from the base portion, and forming a rail extending between the first end of the base portion and a second end of the base portion opposite the first end. A least one of the forming the attachment flange, the forming the pin, or the forming the rail may comprise using a second manufacturing process, the second manufacturing process comprising an additive manufacturing technique.

In various embodiments, the first manufacturing process comprises at least one of forging, extrusion, casting, machining, stamping, or subtractive manufacturing.

In various embodiments, the method may further comprise forming at least one of the attachment flange, the pin, or the rail comprising a coating located at an exterior of the at least one of the attachment flange, the pin, or the rail. Forming the at least one of the attachment flange, the pin, or the rail comprising the coating may comprise forming an interior portion of the at least one of the attachment flange, the pin, or the rail using a first metal alloy, forming an exterior portion of the at least one of the attachment flange, the pin, or the rail using a second metal alloy, and forming a gradient transition extending between the interior portion and the exterior portion.

In various embodiments, the first metal alloy may comprise a first percentage by weight of a wear resistant coating material, the second metal alloy may comprise a second percentage by weight of the wear resistant coating material, and the gradient transition may comprise an increasing percentage by weight of the wear resistant coating material. In various embodiments, the wear resistant coating material may comprise at least one of a metal carbide, a nickel alloy, or a nickel-based super alloy.

In various embodiments, the method may further comprise forming the gradient transition including a percent by weight of the wear resistant coating material defined by a smooth function of position along the gradient transition. The smooth function of position may comprise at least one a linear function, a logarithmic function, an exponential function, or a quadratic function. In various embodiments, the method may further comprise forming the coating extending over, at least a portion of, a surface of the base portion.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
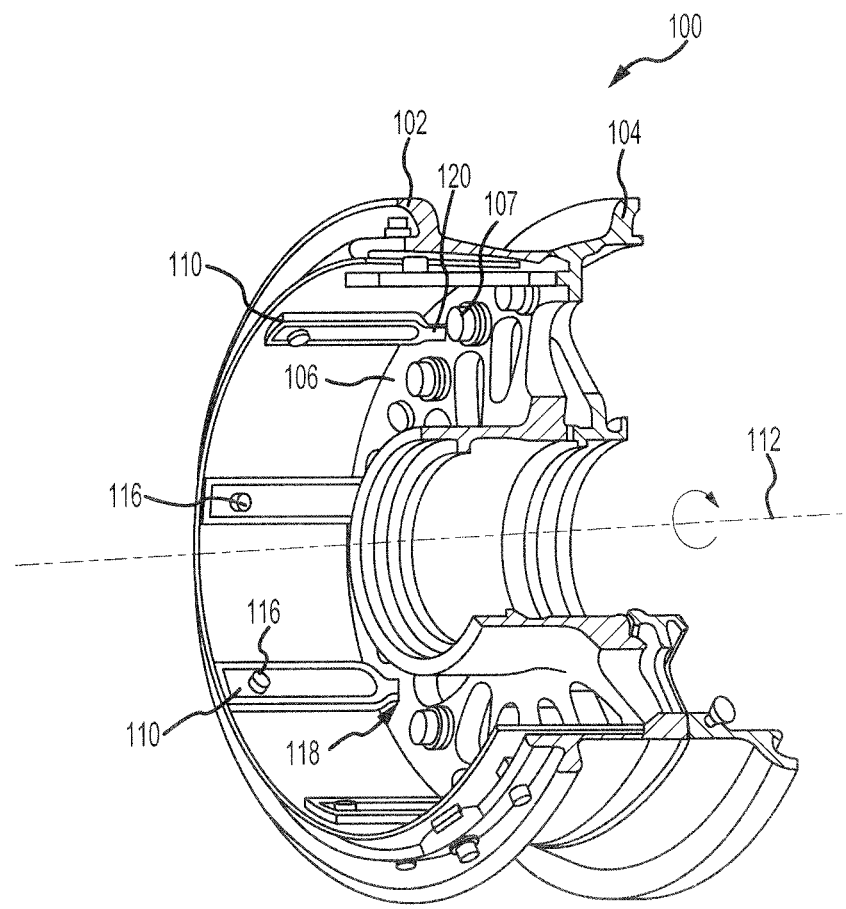
FIG. 1 illustrates a perspective view of a wheel assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "distal" refers to the direction outward, or generally, away from a reference component. As used herein, "proximate" refers to a direction inward, or generally, towards the reference component.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, turning, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Conventional torque bars are generally formed into the desired shape using traditional manufacturing methods, such as casting, forging, or subtractive manufacturing. Such techniques tend to limit the potential geometries of the torque bars and increase material waste, resulting in torque bars of increased weight and greater cost. Hybrid torque bars of the present disclosure, in various embodiments, include a first component (e.g., a base portion) formed using a traditional, non-additive manufacturing technique, and a second component (e.g., a rail or a pin) formed using an additive manufacturing technique. Forming one or more components of the hybrid torque bars using an additive manufacturing technique tends to allow for geometries that decrease an overall weight of the hybrid torque bar, while reducing waste material. Furthermore, additive manufacturing techniques can enable designs, features, and structures, which could not otherwise be produced through conventional manufacturing. For example, in various embodiments, additive manufacturing techniques may be employed to make hybrid torque bars having hollow sections and lattice structures, graded material compositions, and other multi-functional behavior (e.g., wear resistance in some locations and thermal stability or increased conductivity in other locations). Design methods, including topology optimization, utilize numerical optimization methods to assist in selection of a design for the structural components, by locating material within a design/structure based on performance criteria (e.g., structural loads, thermal loads, etc.). These designs can be organic in shape/design/structure, and may not be capable of fabrication via traditional methods due to their high complexity. Additive manufacturing can enable fabrication of these complex designs within hybrid torque bars.

In various embodiments, additive manufacturing techniques may also be employed to form a coating or coatings (e.g., a wear resistant coating) along an exterior surface of one or more components of the hybrid torque bar. In this regard, additive manufacturing can create a gradient transition into the coating, which tends to decrease a likelihood of separation or delaminating of the coating from the underlying torque bar component.

With reference to FIG. 1, a wheel assembly 100 is illustrated in accordance with various embodiments. Wheel assembly 100 may comprise an inboard wheel half 102 and an outboard wheel half 104. Inboard wheel half 102 includes a radially extending portion 106. Radially extending portion 106 may be located proximate outboard wheel half 104 and may receive fasteners 107 configured to secure outboard wheel half 104 to inboard wheel half 102. Fastener 107 may comprise a bolt, screw, rivet, pin, clip, or other suitable securement mechanism.

Wheel assembly 100 may further comprise a plurality of torque bars 110. Torque bars 110 may be located circumferentially along a radially inward surface of inboard wheel half 102. In various embodiments, torque bars 110 are oriented parallel to an axis of rotation 112 of wheel assembly 100. Torque bars 110 may be configured to engage a brake assembly disposed within wheel assembly 100.

Torque bars 110 may be coupled to inboard wheel half 102. For example, torque bars 110 may be coupled to inboard wheel half 102 via a fastener 116. Fastener 116 may comprise a bolt, screw, rivet, pin, clip, or other suitable securement mechanism. A pin 120 of torque bar 110 may be located in radially extending portion 106 of inboard wheel half 102. For example, radially extending portion 106 of inboard wheel half 102 may define a receptacle or orifice 118 configured to receive pin 120. In various embodiments, receptacle 118 may comprise a pin or stud over which an opening 122 (with momentary reference to FIG. 2A) in the end of pin 120 slides.

Figure 2A:
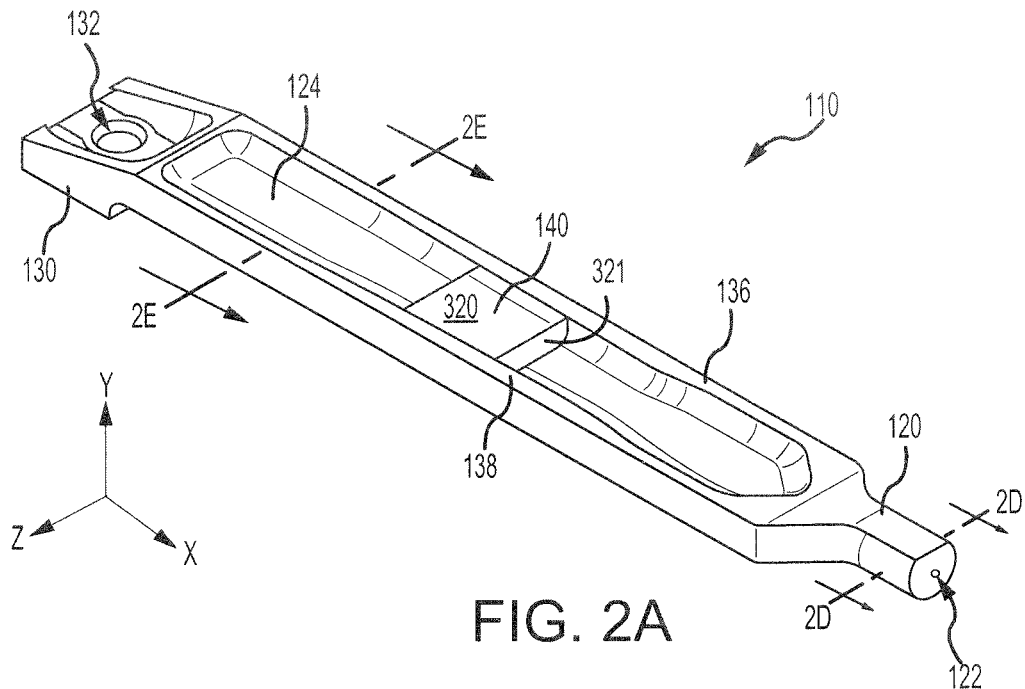
FIGS. 2A and 2B illustrate perspective views of a hybrid torque bar, in accordance with various embodiments.
Figure 2B:
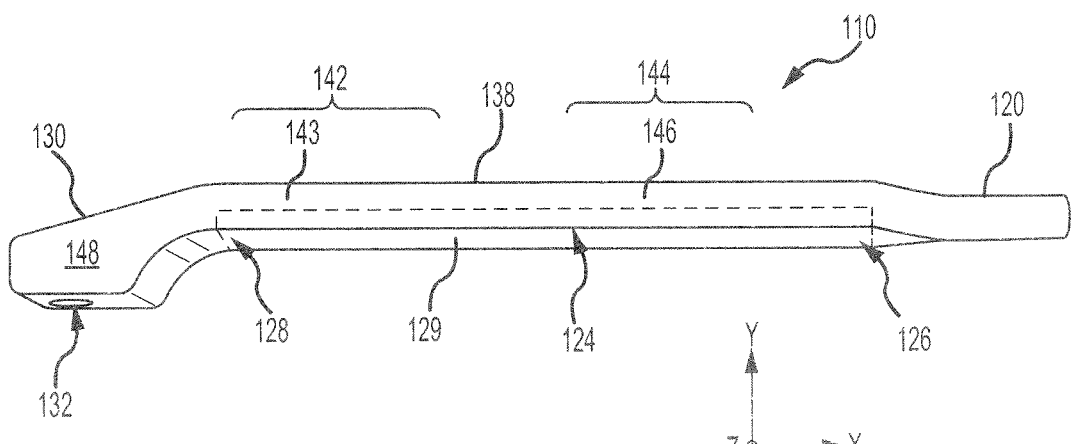

With reference to FIGS. 2A and 2B, a torque bar 110 is illustrated, in accordance with various embodiments. Torque bar 110 includes a base portion 124, an attachment flange 130 formed on one end of base portion 124, and pin 120 formed on the opposite end of base portion 124. Torque bar 110 further includes rail 136 and 138. Torque bar 110 is a hybrid torque bar. As used herein, a "hybrid torque bar" refers to a torque bar having at least one component (e.g., pin 120, attachment flange 130, and/or rails 136 and 138) formed using an additive manufacturing technique, for example, wire arc additive manufacturing or electron beam additive manufacturing, and at least one component (e.g., base portion 124) formed using a non-additive manufacturing technique, for example, forging, extrusion, machining, casting, stamping, or subtractive manufacturing.

Figure 2C:
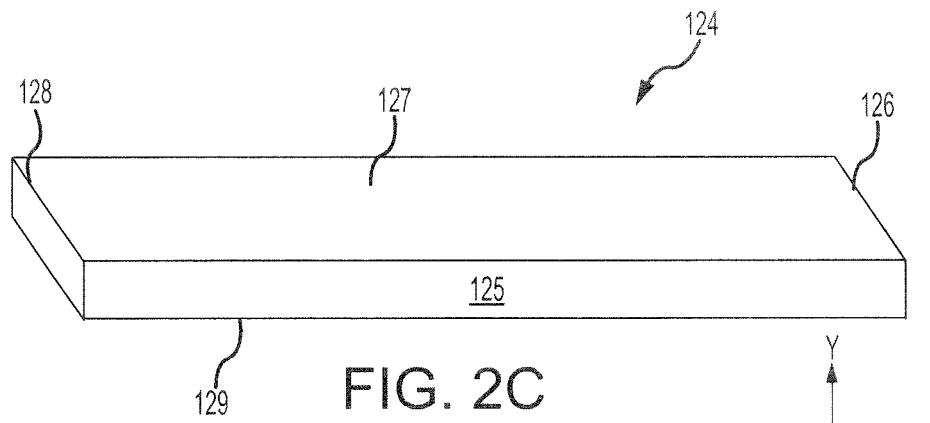
FIG. 2C illustrates a perspective view of a base portion of a hybrid torque bar, in accordance with various embodiments.

Referring to FIG. 2C, base portion 124 of torque bar 110 is illustrated, in accordance with various embodiments. Base portion 124 may comprise a generally rectangular shape including a first end 126, a second end 128 opposite first end 126, and opposing surfaces 127 and 129 extending from first end 126 to second end 128. Base portion 124 may be formed using a manufacturing process that employs non-additive manufacturing techniques. For example, base portion 124 may be formed by forging, extrusion, machining, casting, stamping, subtractive manufacturing, and/or other suitable non-additive manufacturing technique.

Base portion 124 is formed from a metal alloy 125. In various embodiments, base portion 124 may be made from a nickel-based alloy conforming to the unified numbering system standard (UNS) N07718 and comprising, by wt %, between 17% and 21% chromium, between 2.8% and 3.3% molybdenum, between 50% and 55% nickel, and between 4.75% and 5.5% niobium, and which is available under the trade name INCONEL® 718, available from the Special Metals Corporation of Huntington, W. Va., USA. As another example, base portion 124 may be made from a precipitation-hardened chromium-nickel-aluminum-based stainless steel alloy conforming to the UNS S17700, and which is comprised of, by wt %, a maximum of 0.09% carbon, a maximum of 1% manganese, a maximum of 1% silicon, between 16% and 18% chromium, between 6.5% and 7.75% nickel, between 0.75% and 1.5% aluminum, a maximum of 0.04% phosphorus, a maximum of 0.03% sulfur, and a remaining balance of iron, and which is available under the trade name 17-7 PH®, available from AK Steel of West Chester, Ohio, USA). As yet another example, base portion 124 may comprise a nickel-cobalt-based alloy conforming to the UNS N13100 and comprising, by wt %, a maximum of between 0.15% and 0.2% carbon, between 8% and 11% chromium, between 13% and 17% cobalt, between 2% and 4% molybdenum, between 4.5% and 5% titanium, between 5% and 6% aluminum, and a remaining balance of nickel, and which is available under the trade name IN® 100, available from the Metal Tek International of Waukesha, Wis., USA.

Base portion 124 may also be made from a nickel-based super alloy, a martensitic chromium-nickel-copper precipitation hardening stainless steel alloy conforming to UNS S17400, a nickel-chromium-molybdenum low alloy steel conforming to UNS G86200, a chromium-nickel-molybdenum low alloy steel conforming to UNS G43400, a low alloy, heat resistant steel conforming to UNS K23015, or any other suitable material. The relatively simple geometry (e.g., the rectangular shape) of base portion 124 tends to reduce manufacturing time and product waste.

Referring to FIGS. 2A and 2C, pin 120 may be formed extending axially (i.e., in the direction of the x-axis of FIG. 2A and generally parallel to axis of rotation 112 in FIG. 1) from first end 126 of base portion 124. In various embodiments, pin 120 is formed using a manufacturing process that employs an additive manufacturing technique. For example, pin 120 may be formed by wire arc additive manufacturing, electron beam additive manufacturing, or other suitable additive manufacturing technique. In this regard base portion 124 may be formed by forging, extrusion, casting, and/or machining, and pin 120 may be formed by additive manufacturing.

Employing additive manufacture to form pin 120 allows the material(s) and/or design of pin 120 to be optimized for wear resistance, thermal protection, thermal conduction, load strength, bending resistance, and/or improved vibration damping characteristics. In this regard, the material (e.g., the metal alloy) of pin 120 may be selected and/or varied across pin 120 to reduce wear, tune stiffness, reduce weight, tune bending resistance, improve vibration characteristics, increase thermal resistance, and/or protect against oxidation. For example, a portion of pin 120 that experiences increased bending loads may comprise a metal alloy having an increased resistance to bending as compared to the metal alloy of a portion of pin 120 that does not experience increased bending loads during use. In this regard, forming components (e.g., pin 120, rails 136, 138, etc.) of hybrid torque bar 110 using additive manufacturing may enable multi-functional optimization on a location-by-location basis.

Figure 2D:
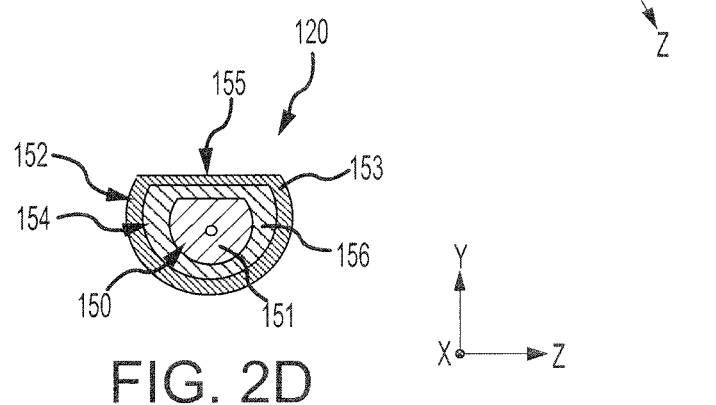
FIG. 2D illustrates a cross-sectional view of the hybrid torque bar of FIG. 2A as viewed from the line 2D-2D in FIG. 2A, in accordance with various embodiments.

FIG. 2D illustrates a cross-sectional view of pin 120 taken along the line 2D-2D in FIG. 2A. In various embodiments, a coating 155, for example, a wear resistance coating, a thermal resistance coating, a corrosion resistance coating, or a combination of two or more coating types may be formed proximate an exterior of pin 120 using additive manufacturing. Stated differently, during formation of pin 120, coating 155 may be deposited using additive manufacturing and may form, an exterior portion 152 of pin 120. Coating 155 may be formed using a metal alloy 153. In various embodiments, metal alloy 153 may comprise a wear resistant coating material. In various embodiments, the wear resistant coating material may comprise a metal carbide, for example, a tungsten carbide (e.g., tungsten carbide cobalt, tungsten carbide cobalt chromium), a chromium carbide, a vanadium carbide, or the like. In various embodiments, the wear resistant coating material may comprise a nickel-based alloy, (e.g., a nickel sulfur alloy, a nickel phosphorus alloy, a nickel polytetrafluoroethylen (PTFE) composite alloy, etc.), a nickel-based super alloy, or the like.

In various embodiments, pin 120 may include an intermediate portion 154 extending between an interior portion 150 of pin 120 and exterior portion 152. Interior portion 150 of pin 120 may be formed using a metal alloy 151. In various embodiments, metal alloy 151 may comprise the same or a similar material to metal alloy 125 of base portion 124. In various embodiments, intermediate portion 154 may comprise a metal alloy 156. Metal alloy 156 may comprise a wear resistant coating material. In various embodiments, a thickness of intermediate portion 154 and metal alloy 156 may be different from a thickness of exterior portion 152 and metal alloy 153. In various embodiments, exterior portion 152 may form a topcoat over intermediate portion 154. For example, intermediate portion 154 may comprise a metal carbide and exterior portion 152 may comprise a nickel-based alloy topcoat formed over intermediate portion 154. In various embodiments, intermediate portion 154 may comprise a metal carbide or a nickel-based alloy and exterior portion 152 may comprise a nickel PTFE composite alloy topcoat formed over intermediate portion 154.

In various embodiments, intermediate portion 154 may form a gradient transition between metal alloy 151 of interior portion 150 and metal alloy 153 of exterior portion 152. The gradient transition (i.e., intermediate portion 154) may have a percent by weight of metal alloy 153 defined by a smooth function of position along the gradient transition. The gradient transition may also have a smooth function of percent by weight of the metal alloy 151 of interior portion 150 relative to position along the gradient transition. For example, the transition from metal alloy 151 of interior portion 150 to metal alloy 153 of exterior portion 152 may be linear, logarithmic, exponential, quadratic, or any other smoothly defined and continuous function. The percent by weight of metal alloy 153 may thus increase as the gradient transition goes from interior portion 150 to exterior portion 152.

In various embodiments, metal alloy 151 comprises a first percentage (e.g., 0%-20%, 0%-10%, or 0%-5%) by weight of a wear resistant coating material (e.g., a metal carbide, a nickel-based alloy, a nickel-based super alloy), metal alloy 153 comprises a second percentage (e.g., 60%-99%, 70%-95%, or 80%-95%) by weight of the wear resistant coating material, and intermediate portion 154 (i.e., the gradient transition) comprises an increasing percentage by weight of the wear resistant coating material. For example, the percentage by weight of the wear resistant coating material (e.g., the percent by weight of the metal carbide) may increase in intermediate portion 154 between interior portion 150 and exterior portion 152. The gradient transition of intermediate portion 154 may increase an adhesion and/or bonding strength of metal alloy 153 and exterior portion 152 to metal alloy 151 and interior portion 150. In this regard, intermediate portion 154 forming a gradient transition may reduce the stress caused by differences in the coefficient of thermal expansion (CTE) between metal alloy 153 and metal alloy 151.

Returning to FIG. 2A, torque bar 110 further comprises rail 136 and rail 138. In various embodiments, rails 136 and 138 are parallel to one another and extend axially (i.e., in the direction of the x-axis and generally parallel to axis of rotation 112 in FIG. 1) between first end 126 and second end 128 of base portion 124. Rails 136 and 138 may extend radially (i.e., in a direction generally orthogonal to the x-axis in FIG. 2A and axis of rotation 112 in FIG. 1) away from surface 127 of base portion 124.

In various embodiments, rails 136 and 138 may be formed using a manufacturing process that employs an additive manufacturing technique. For example, rails 136 and 138 may be formed by wire arc additive manufacturing, electron beam additive manufacturing, or other suitable additive manufacturing technique. In this regard, base portion 124 may be formed by forging, extrusion, casting, and/or machining, and rails 136 and 138 may be formed by additive manufacturing.

Employing additive manufacture to form rails 136 and 138 allows the material(s) and/or design of rails 136 and 138 to be optimized for wear resistance, thermal protection, thermal conduction, load strength, bending resistance, and/or improved vibration damping characteristics. In this regard, the material (e.g., the metal alloy) of rails 136 and 138 may be selected and/or varied across rails 136 and 138 to reduce wear, tune stiffness, reduce weight, tune bending resistance, improve vibration characteristics, increase thermal resistance, and/or protect against oxidation. For example, with reference to FIG. 2B, in various embodiments, a portion 142 of rail 138 may comprise a metal alloy 143, and a portion 144 of rail 138 may comprise a metal alloy 146 that is different from metal alloy 143. Stated differently, portion 142 may be formed by depositing metal alloy 143 over base portion 124 using wire arc or electron beam additive manufacturing, and portion 144 may be formed by depositing metal alloy 146. In various embodiments, portion 142 may comprise a material having a greater heat resistance (i.e., higher melting point), a greater tensile strength, and/or a greater creep resistance as compared to the material of portion 144. In various embodiments, portion 142 may comprise a material having a different thermal conductivity as compared to the material of portion 144 to provide variable heat conduction during braking. In various embodiment, the transition between portion 142 and portion 144 may be a gradient transition. In this regard, forming components (e.g., rails 136, 138, pin 120, etc.) of hybrid torque bar 110 using additive manufacturing may enable multi-functional optimization on a location-by-location basis. While rail 138 is shown having axially adjacent portions of varying materials, it should be understood that rail 138 may be formed having radially adjacent, circumferentially adjacent, and/or diagonally adjacent portions of varying materials.

Figure 2E:
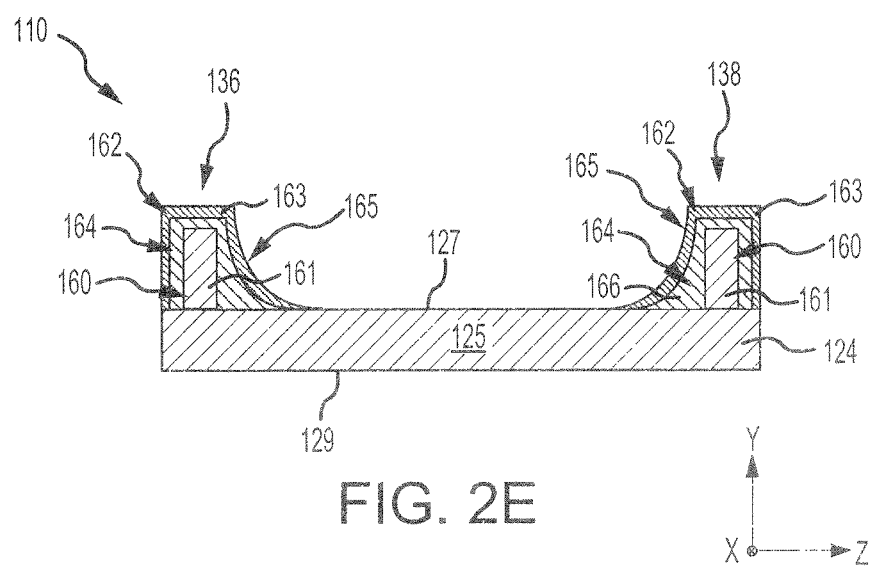
FIG. 2E illustrates a cross-sectional view of the hybrid torque bar of FIG. 2A as viewed from the line 2E-2E in FIG. 2A, in accordance with various embodiments.

FIG. 2E illustrates a cross-sectional view of torque bar 110 taken along the line 2E-2E in FIG. 2A. In various embodiments, a coating 165, for example, a wear resistance coating, a thermal resistance coating, a corrosion resistance coating, or a combination of two or more coating types may be formed proximate an exterior of rails 136 and 138 using additive manufacturing. Stated differently, during formation of rails 136 and 138, coating 165 may be deposited using additive manufacturing and may form an exterior portion 162 of rails 136 and 138. Coating 165 may be formed using a metal alloy 163. In various embodiments, metal alloy 163 may be the same as metal alloy 153 of pin 120 (with momentary reference to FIG. 2D). In this regard, metal alloy 163 may comprise a wear resistant coating material, for example, a metal carbide, a nickel-based alloy, a nickel-based super alloy, or the like.

In various embodiments, rails 136, 138 may include an intermediate portion 164 extending between an interior portion 160 of rails 136, 138 and exterior portion 162. In various embodiments, intermediate portion 164 may comprise a metal alloy 166, similar to metal alloy 156 in FIG. 2D. In various embodiments, intermediate portion 164 may comprise a gradient transition, similar intermediate portion 154 in FIG. 2D. Interior portion 160 of rails 136 and 138 may be formed using a metal alloy 161. In various embodiments, metal alloy 161 may comprise the same or a similar material to metal alloy 125 of base portion 124 and/or the same or a similar material to metal alloy 151 of pin 120 (with momentary reference to FIG. 2D).

Returning to FIG. 2A, in various embodiments, torque bar 110 may further comprise a cross member 140 extending between rail 136 and rail 138. In various embodiments, cross member 140 may be formed using a manufacturing process that employs an additive manufacturing technique. In various embodiments, cross member 140 may be formed using the same material (i.e., metal alloy) as base portion 124. In various embodiments, a wear resistance coating, a thermal resistance coating, a corrosion resistance coating, or a combination of two or more coating types may be formed proximate an exterior of cross member 140 using additive manufacturing. An intermediate portion, which may comprise a gradient transition, similar to intermediate portion 154 in FIG. 2D, may extend between an interior portion and the exterior of cross member 140.

Figure 5A:
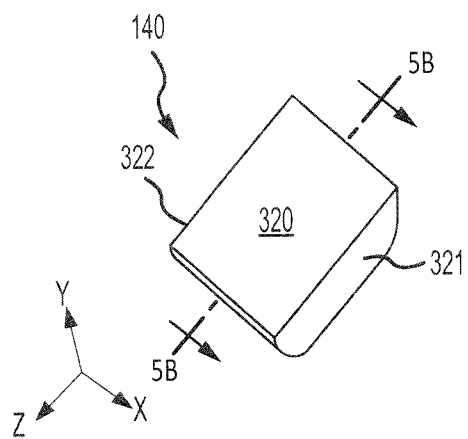
FIGS. 5A, 5B, 5C, and 5D illustrate a cross member of hybrid torque bar, in accordance with various embodiments.
Figure 5B:
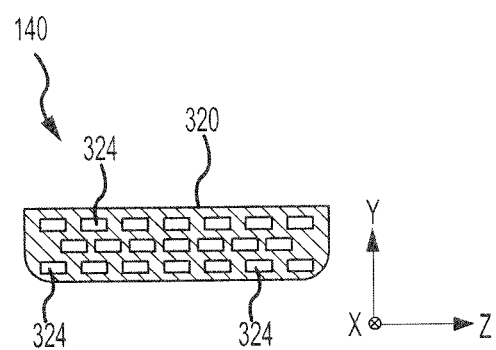

In various embodiments, using additive manufacturing to form cross member 140, may allow cross member 140 to be formed having a hollow or honeycomb geometry. Referring to FIG. 5A, a perspective view of cross member 140 is illustrated. Cross member 140 includes a surface 320 oriented generally way from base portion 124, with momentary reference to FIG. 2A. Surface 320 is generally parallel the x-axis. Cross member 140 further includes opposing surfaces 321 and 322. Surfaces 321 and 322 extend between base portion 124 (with momentary reference to FIG. 2A) and surface 320, and are generally orthogonal to the x-axis. FIG. 5B illustrates a cross-section view of cross member 140 taken along the line 5B-5B in FIG. 5A. In various embodiments, cross member 140 may include and define openings 324. In various embodiments, one or more openings 324 is formed partially through cross member 140 in the axial direction (i.e., in the direction of the x-axis), such that a portion of cross member 140 remains between opening 324 and surface 321 and/or between opening 324 and surface 322. In various embodiments, one or more openings 324 may extend completely through cross member 140 in the axial direction, such that opening 324 extends from surface 321 to surface 322. While openings 324 are illustrated having a generally rectangular geometry, it should be understood that openings 324 may be formed having an oval, circular, hexagonal, polygonal, or any other shape or combination of shapes.

Figure 5C:
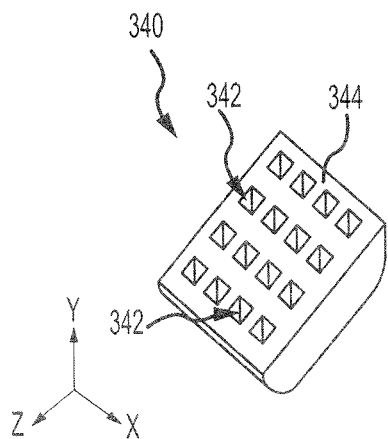

FIG. 5C illustrates a perspective view of a cross member 340 including and defining openings 342. In various embodiments, cross member 340 may be formed in hybrid torque bar 110 in place of cross member 140 (with momentary reference to FIG. 2A). Openings 342 may extend in a radial direction, generally orthogonal to the axial direction (i.e., in the direction of the y-axis). In various embodiments, one or more openings 342 may extend completely through cross member 340 in the radial direction, such that the opening 342 extends through surface 344 of cross member 340. In various embodiments, one or more openings 342 may be formed partially through cross member 340 in the radial direction, such that a portion of cross member 340 remains between the opening 342 and surface 344 of cross member 340. While openings 342 are illustrated having a generally square geometry, it should be understood that openings 342 may be formed having an oval, circular, hexagonal, polygonal, or any other shape or combination of shapes.

Figure 5D:
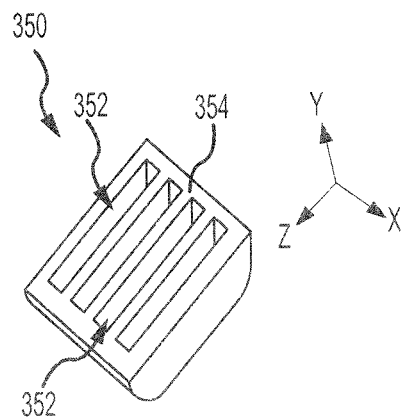

FIG. 5D illustrates a perspective view of a cross member 350 including and defining openings 352. In various embodiments, cross member 350 may be formed in hybrid torque bar 110 in place of cross member 140 (with momentary reference to FIG. 2A). Openings 352 may extend in a radial direction, generally orthogonal to the axial direction (i.e., in the direction of the y-axis). Openings 352 may be elongated in the circumferential direction (i.e., in the direction of the z-axis), such that the openings 352 extend a greater distance in the circumferential direction as compared to the axial direction. Stated differently, a dimension of opening 352 as measured along the z-axis is greater than a dimension of opening 352 as measured along the x-axis. In various embodiments, one or more openings 352 may extend completely through cross member 350 in the radial direction, such that the opening 352 extends through a surface 354 of cross member 350. In various embodiments, one or more openings 352 may be formed partially through cross member 350 in the radial direction, such that a portion of cross member 350 remains between the opening 352 and surface 354 of cross member 350. While openings 352 are illustrated having a generally rectangular geometry, it should be understood that openings 342 may be formed having an oval, circular, hexagonal, polygonal, or any other shape or combination of shapes.

Referring to FIG. 2B, in various embodiments, torque bar 110 further includes attachment flange 130. Attachment flange 130 may be formed extending from second end 128 of base portion 124. Attachment flange 130 may define a mounting hole 132. Mounting hole 132 may be configured to receive fastener 116, with momentary reference to FIG. 1 and couple torque bar 110 to inboard wheel half 102.

In various embodiments, attachment flange 130 is formed using a manufacturing process that employs an additive manufacturing technique. Attachment flange 130 comprises a metal alloy 148. In various embodiments, metal alloy 148 may be the same as or similar to the metal alloy used to form base portion 124. In various embodiments, a wear resistance coating, a thermal resistance coating, a corrosion resistance coating, or a combination of two or more coating types may be formed proximate an exterior of attachment flange 130 using additive manufacturing. An intermediate portion, which may comprise a gradient transition, similar to intermediate portion 154 in FIG. 2D, may extend between an interior portion and the exterior of attachment flange 130. In various embodiments, using additive manufacturing to form attachment flange 130, may allow attachment flange 130 to be formed having a honeycomb structure. Stated differently, a cross-section of attachment flange 130 may comprise a honeycomb geometry.

Figure 3A:
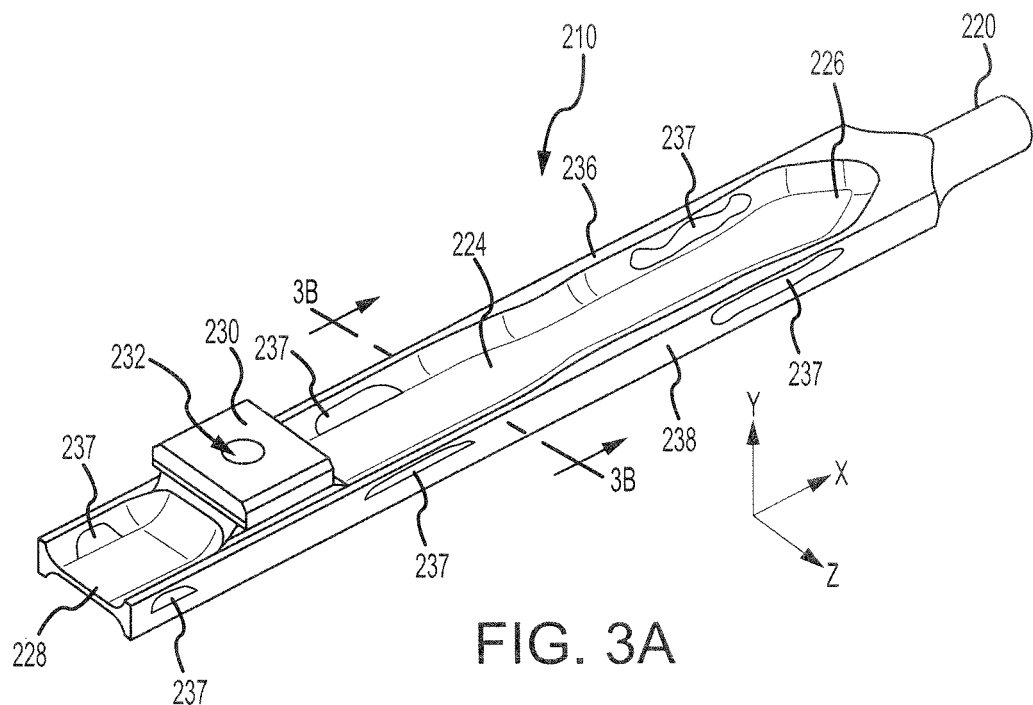
FIG. 3A illustrates a perspective view of a hybrid torque bar, in accordance with various embodiments.

Referring to FIG. 3A, a torque bar 210 is illustrated, in accordance with various embodiments. Torque bar 210 comprises a base portion 224 and a pin 220 extending from a first end 226 of base portion 224. Torque bar 210 further comprises rails 236 and 238 which extend between first end 226 and a second end 228 of base portion 224. In various embodiments, torque bar 210 may be employed in wheel assembly 100 in place of a torque bar 110 (with momentary reference to FIG. 1).

Figure 3B:
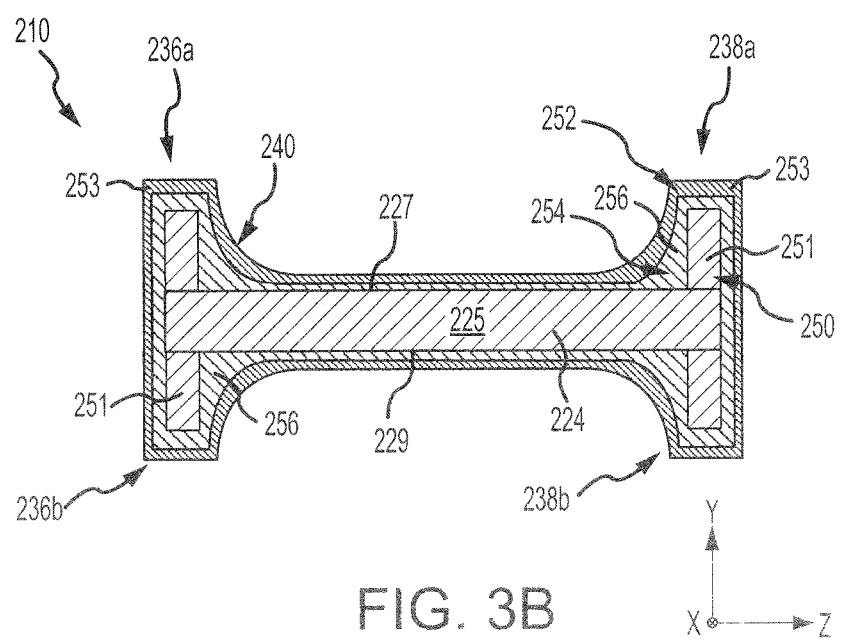
FIG. 3B illustrates a cross-sectional view of the hybrid torque bar of FIG. 3A as viewed from the line 3B-3B in FIG. 3A, in accordance with various embodiments.

With combined reference to FIGS. 3A and 3B, in various embodiments, torque bar 210 comprise an "I" shaped cross-section. A portion 236a of rail 236 extends from surface 227 of base portion 124 in a first direction and a portion 236b of rail 236 extend from surface 229 of base portion in a second direction opposite the first direction. Similarly, a portion 238a of rail 238 extends from surface 227 in the first direction and a portion 238b of rail 238 extends from surface 229 in the second direction. In various embodiments, an attachment flange 230 may extend radially, in the first direction from surface 227 of base portion 224. Attachment flange 230 may define a mounting hole 232. In various embodiments, attachment flange 230 may be located between second end 228 and first end 226 of base portion 224.

Torque bar 210 is a hybrid torque bar. At least one component (e.g., pin 220, attachment flange 230, and/or rails 236 and 238) of torque bar 210 is formed using an additive manufacturing technique, for example, wire arc additive manufacturing or electron beam additive manufacturing, and at least one component (e.g., base portion 224) is formed using a non-additive manufacturing technique, for example, forging, extrusion, machining, casting, stamping, or subtractive manufacturing. Using additive manufacturing to form rails 236 and 238 may allow rails 236 and 238 to include (i.e., define) voids or hollow portions 237. In this regard, rails 236 and 238 may comprise a lattice structure. Hollow portions 237 may decrease a weight and/or a material cost of torque bar 210. The location of hollow portions 237 may be selected using topology optimization and performance criteria (e.g., structural loads, thermal loads, etc.) experienced by rails 236 and 238. In various embodiments, using additive manufacturing to form attachment flange 230, may allow attachment flange 230 to be formed having a hollow portions, similar to hollow portion 237, or a honeycomb structure.

In various embodiments, a coating 240, for example, a wear resistance coating, a thermal resistance coating, a corrosion resistance coating, or a combination of two or more coating types may be formed proximate an exterior of torque bar 210 using additive manufacturing. Stated differently, coating 240 may be deposited using additive manufacturing and may form, at least a portion of, an exterior surface of base portion 224, pin 220, attachment flange 230, and/or rails 236 and 238. In various embodiments, rails 236 and 238 may include an intermediate portion 254 and an exterior portion 252. Intermediate portion 254 may extend between an interior portion 250 of rails 236 and 238 and exterior portion 252. In this regard, exterior portion 252 forms the exterior portion of rails 236 and 238. Intermediate portion 254 may also extend between base portion 224 and exterior portion 252, and/or between exterior portion 252 and interior portions of pin 220 and attachment flange 230. In various embodiments, exterior portion 252 may comprise a metal alloy 253, and intermediate portion 254 may comprise a metal alloy 256. Metal alloys 253 and 256 may comprise wear resistant coating material, for example, a metal carbide, a nickel-based alloy, a nickel-based super alloy, or the like. In various embodiments, a thickness of intermediate portion 254 and metal alloy 256 may be different from a thickness of exterior portion 252 and metal alloy 253. In various embodiments, exterior portion 252 may form a topcoat over intermediate portion 254. For example, intermediate portion 254 may comprise a metal carbide and exterior portion 252 may comprise a nickel-based alloy topcoat formed over intermediate portion 254. In various embodiments, intermediate portion 254 may comprise a metal carbide or nickel-based alloy, and exterior portion 252 may comprise a nickel PTFE composite alloy topcoat formed over intermediate portion 254.

In various embodiments, intermediate portion 254 may form a gradient transition between metal alloy 253 and a metal alloy 251 at the interior portion 250 of rails 236, 238, and between metal alloy 253 and a metal alloy 225 of base portion 224. In various embodiments, metal alloy 251 may be the same or similar to metal alloy 225. A gradient transition may also be formed between metal alloy 253 and a metal alloy at the interior of pin 220 and attachment flange 230. The gradient transition (i.e., intermediate portion 254) may have a percent by weight of metal alloy 253 defined by a smooth function of position along the gradient transition. The gradient transition may also have a smooth function of percent by weight of metal alloy 251 and/or metal alloy 225 relative to position along the gradient transition. For example, the transition from metal alloy 251 to metal alloy 253 may be linear, logarithmic, exponential, quadratic, or any other smoothly defined and continuous function. The percent by weight of metal alloy 253 may thus increase as the gradient transition goes from interior portion 250 to exterior portion 252 and from base portion 224 to exterior portion 252.

Figure 4A:
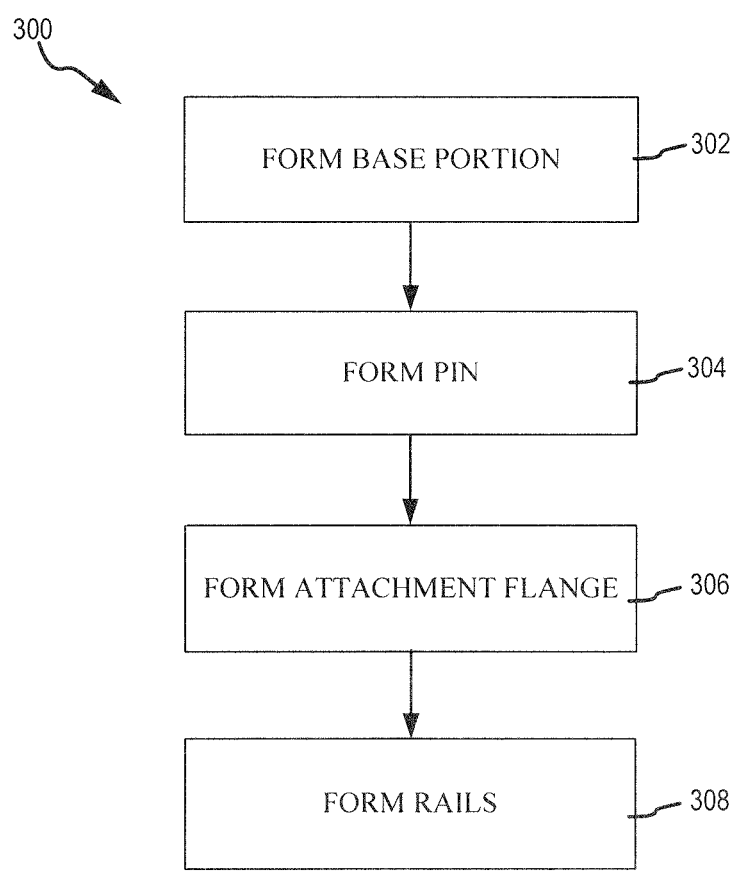
FIGS. 4A and 4B illustrate a method of making a hybrid torque bar, in accordance with various embodiments.
Figure 4B:
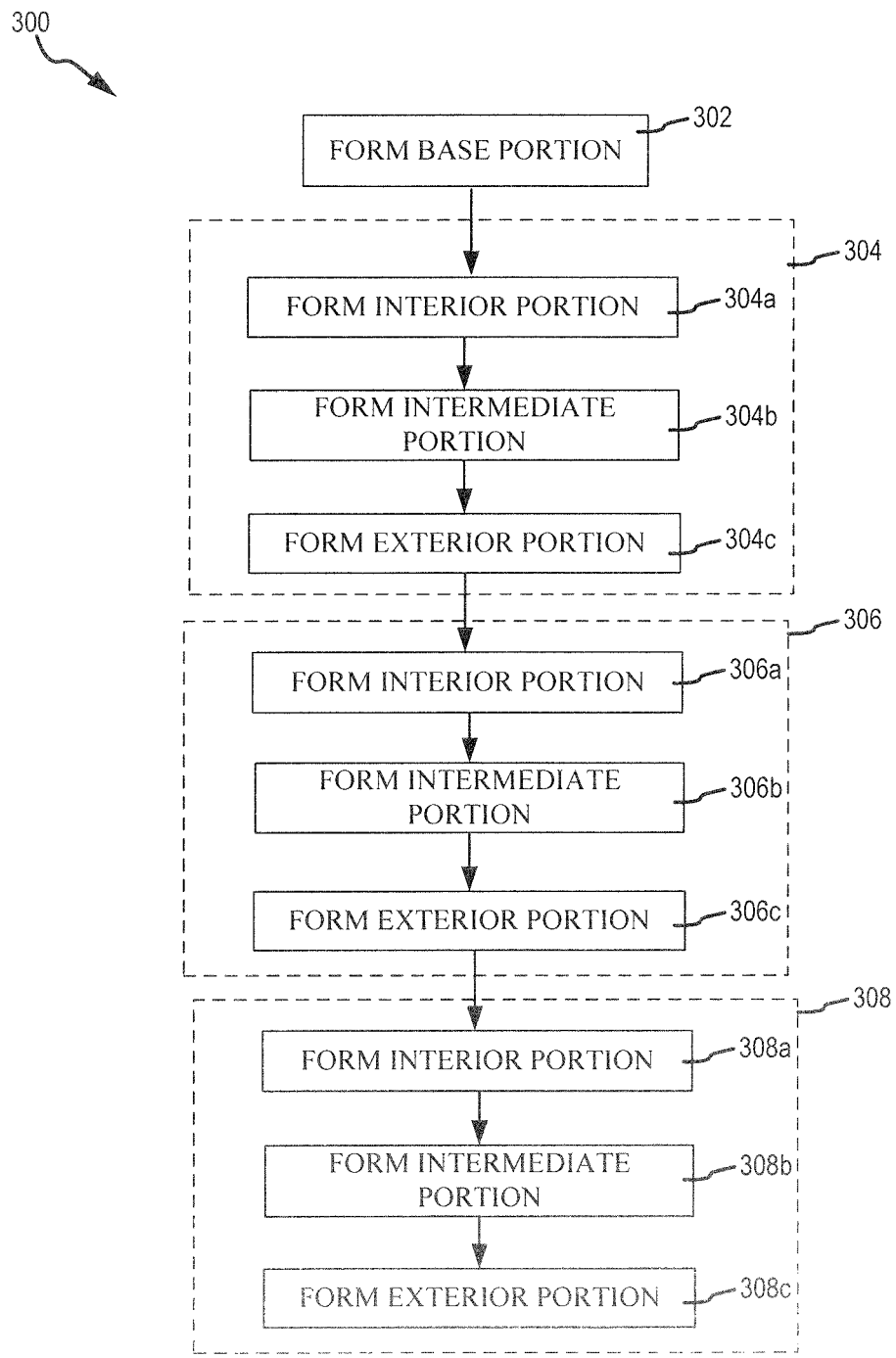

FIGS. 4A and 4B illustrate a method 300 of making a hybrid torque tube for a wheel assembly, in accordance with various embodiments. Method 300 may comprise forming a base portion using a first manufacturing process (step 302). In various embodiments, the first manufacturing process comprises forging, extrusion, casting, machining and/or subtractive manufacturing. Method 300 may further comprise forming a pin extending from a first end of the base portion (step 304). In various embodiments, step 302 includes forming the base portion using a non-additive manufacturing technique, for example, forging, extrusion, casting, machining, and step 304 includes forming the pin using an additive manufacturing technique, for example, wire arc or electron beam additive manufacturing.

In various embodiments, forming the pin may include forming a coating located at an exterior of the pin. In this regard, in various embodiments, step 304 may comprising forming an interior portion of the pin using a first metal alloy (step 304a), forming an intermediate portion over the interior portion (step 304b), and forming an exterior portion of the pin using a second metal alloy (step 304c). In various embodiments, the intermediate portion may form a gradient transition between the interior portion and exterior portion. Steps 304a, 304b, and 304c may be performed using additive manufacturing. In various embodiments, the first metal alloy may comprise a first percentage by weight of a wear resistant coating material, the second metal alloy may comprise a second percentage by weight of the wear resistant coating material, and the gradient transition (i.e., intermediate portion) may comprise an increasing percentage by weight of the wear resistant coating material. In various embodiments, the wear coating material may comprise a metal carbide, a nickel-based alloy, a nickel-based super alloy, and/or combinations thereof.

Method 300 further comprises forming an attachment flange extending from the base portion (step 306). In various embodiments, step 302 includes forming the base portion using a non-additive manufacturing technique, for example, forging, extrusion, casting, machining, and step 306 includes forming the attachment flange using an additive manufacturing technique, for example, wire arc or electron beam additive manufacturing.

In various embodiments, forming the attachment flange may include forming a coating located at an exterior of the attachment flange. In this regard, in various embodiments, step 306 may comprising forming an interior portion of the attachment flange using a first metal alloy (step 306a), forming an intermediate portion over the interior portion (step 306b), and forming an exterior portion of the attachment flange using a second metal alloy (step 306c). In various embodiments, the intermediate portion may form a gradient transition between the interior portion and exterior portion. Steps 306a, 306b, and 306c may be performed using additive manufacturing. In various embodiments, the first metal alloy may comprise a first percentage by weight of a wear resistant coating material, the second metal alloy may comprise a second percentage by weight of the wear resistant coating material, and the gradient transition may comprise an increasing percentage by weight of the wear resistant coating material.

Method 300 further includes forming a rail extending between the first end of the base portion and a second end of the base portion opposite the first end (step 308). In various embodiments, step 302 includes forming the base portion using a non-additive manufacturing technique, for example, forging, extrusion, casting, machining, and step 308 includes forming the rail using an additive manufacturing technique, for example, wire arc or electron beam additive manufacturing.

In various embodiments, forming the rail may include forming a coating located at an exterior of the rail. In this regard, in various embodiments, step 308 may comprise forming an interior portion of the rail using a first metal alloy (step 308a), forming an intermediate portion over the interior portion (step 308b), and forming an exterior portion of the rail using a second metal alloy (step 308c). In various embodiments, the intermediate portion may form a gradient transition between the interior portion and exterior portion. Steps 308a, 308b, and 308c may be performed using additive manufacturing. In various embodiments, the first metal alloy may comprise a first percentage by weight of a wear resistant coating material, the second metal alloy may comprise a second percentage by weight of the wear resistant coating material, and the intermediate portion may comprise an increasing percentage by weight of the wear resistant coating material. In various embodiments, the coating may be formed over the base portion of the torque bar.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment. C alone may be present in an embodiment, or that any combination of the elements A, B and C may be present in a single embodiment; for example, A and B, A and C. B and C. or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a hybrid torque bar for a wheel assembly, comprising:
   forming a base portion comprising a first metal alloy using a first manufacturing process;
   forming a pin extending from a first end of the base portion;

forming an attachment flange extending from the base portion; and forming a rail extending between the first end of the base portion and a second end of the base portion opposite the first end, wherein at least one of the attachment flange, the pin, or the rail is formed using a forming method comprising:

forming an interior portion of the at least one of the attachment flange, the pin, or the rail using a second manufacturing process, the second manufacturing process comprising an additive manufacturing technique, wherein the interior portion comprises the first metal alloy and a first percentage by weight of a wear resistant coating material, the wear resistant coating material being different from the first metal alloy;

forming a gradient transition over the interior portion using the second manufacturing process, wherein the gradient transition includes an increasing percentage by weight of the wear resistance coating material; and forming a wear resistant coating over the gradient transition using the second manufacturing process, wherein the wear resistant coating comprises a second percentage by weight of the wear resistant coating material, the second percentage by weight being greater than the first percentage by weight, and wherein the wear resistant coating forms an exterior surface of the at least one of the attachment flange, the pin, or the rail.

2. The method of claim 1, wherein the first manufacturing process comprises at least one of forging, extrusion, casting, machining, stamping, or subtractive manufacturing.

3. The method of claim 1, wherein the wear resistant coating material comprises at least one of a metal carbide, a nickel-based alloy, or a nickel-based super alloy.

4. The method of claim 1, further comprising:

forming the gradient transition on, at least, a portion of a surface of the base portion; and forming the wear resistant coating extending over the gradient transition and the portion of the surface of the base portion.

5. The method of claim 1, wherein the increasing percentage by weight of the wear resistant coating material in the gradient transition is defined by a smooth function of position along the gradient transition.

6. The method of claim 5, wherein the smooth function of position comprises at least one a linear function, a logarithmic function, an exponential function, or a quadratic function.

* * * * *